United States Patent
Huggahalli et al.

(10) Patent No.: US 7,360,027 B2
(45) Date of Patent: Apr. 15, 2008

(54) METHOD AND APPARATUS FOR INITIATING CPU DATA PREFETCHES BY AN EXTERNAL AGENT

(75) Inventors: Ramakrishna Huggahalli, Portland, OR (US); Brannon J. Batson, Boston, MA (US); Raymond S. Tetrick, Portland, OR (US); Robert G. Blankenship, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 306 days.

(21) Appl. No.: 10/966,231

(22) Filed: Oct. 15, 2004

(65) Prior Publication Data

US 2006/0085602 A1   Apr. 20, 2006

(51) Int. Cl.
*G06F 12/00* (2006.01)
(52) U.S. Cl. .................. 711/137; 711/141
(58) Field of Classification Search ............... 711/137, 711/141
See application file for complete search history.

(56) References Cited

U.S. PATENT DOCUMENTS

| | | | |
|---|---|---|---|
| 5,371,870 A | 12/1994 | Goodwin et al. | |
| 6,460,115 B1 | 10/2002 | Kahle et al. | |
| 6,473,832 B1 | 10/2002 | Ramagopal et al. | |
| 6,711,651 B1 | 3/2004 | Moreno et al. | |
| 6,922,753 B2* | 7/2005 | Brown et al. | 711/137 |
| 7,010,666 B1 | 3/2006 | Barber et al. | |
| 7,231,470 B2 | 6/2007 | Huggahalli et al. | |
| 7,246,205 B2 | 7/2007 | Balakrishnan et al. | |
| 2004/0064648 A1 | 4/2004 | Brown et al. | |
| 2004/0117606 A1 | 6/2004 | Wang et al. | |
| 2004/0128450 A1 | 7/2004 | Edirisooriya et al. | |
| 2004/0199727 A1 | 10/2004 | Narad | |
| 2005/0132102 A1* | 6/2005 | Huggahalli et al. | 710/36 |
| 2005/0154836 A1 | 7/2005 | Steely et al. | |
| 2005/0246500 A1 | 11/2005 | Iyer et al. | |
| 2005/0289303 A1 | 12/2005 | Jamil et al. | |
| 2006/0064518 A1 | 3/2006 | Bohrer | |
| 2006/0095679 A1 | 5/2006 | Edirisooriya | |
| 2006/0136671 A1 | 6/2006 | Yavaykar et al. | |

OTHER PUBLICATIONS

Ram Huggahalli et al., "Dynamically Setting Routing Information to Transfer Input Output Data Directly into Processor Caches in a Multi Processor System," U.S. Appl. No. filed on Dec. 16, 2003.

(Continued)

*Primary Examiner*—Jack Lane
(74) *Attorney, Agent, or Firm*—Guojun Zhou (57) ABSTRACT

An arrangement is provided for an external agent to initiate data prefetches from a system memory to a cache associated with a target processor, which needs the data to execute a program, in a computing system. When the external agent has data, it may create and issue a prefetch directive. The prefetch directive may be sent along with system interconnection transactions or sent as a separate transaction to devices including the target processor in the system. When receiving and recognizing the prefetch directive, a hardware prefetcher associated with the target processor may issue a request to the system memory to prefetch data to the cache. The target processor can access data in the cache more efficiently than it accesses data in the system memory. Some pre-processing may also be associated with the data prefetch.

53 Claims, 7 Drawing Sheets

OTHER PUBLICATIONS

PCT/US2005/037165 Int'l Search Report & Written Opinion.
Office Action in corresponding matter U.S. Appl. No. 10/977,830, filed Oct. 28, 2004, to S. Edirisooriya, dated Mar. 7, 2007.
Office Action in corresponding matter U.S. Appl. No. 10/736,765, filed Dec. 16, 2003, to R. Huggahalli, dated Jan. 17, 2006.
Office Action in corresponding matter U.S. Appl. No. 10/736,765, filed Dec. 16, 2003, 2003, to R. Huggahalli, dated Jun. 19, 2006.
Office Action in corresponding matter U.S. Appl. No. 10/736,765, filed Dec. 16, 2003, R. Huggahalli, dated Nov. 13, 2003.
Office Action in corresponding matter U.S. Appl. No. 11/021,143, filed Dec. 22, 2004, to B. Balakrishnan, dated Jan. 23, 2007.
Office Action in corresponding matter U.S. Appl. No. 11/021,143, filed Dec. 22, 2004, to B. Balakrishnan, dated Apr. 18, 2007.
Office Action in corresponding matter U.S. Appl. No. 10/406,798, filed Apr. 2, 2003, to C. Narad, dated Oct. 5, 2005.
Office Action in corresponding matter U.S. Appl. No. 10/406,798, filed Apr. 2, 2003, to C. Narad, dated Jul. 12, 2006.
Office Action in corresponding matter U.S. Appl. No. 10/406,798, filed Apr. 2, 2003, to C. Narad dated Mar. 16, 2006.
Office Action in corresponding matter U.S. Appl. No. 10/406,798, filed Apr. 2, 2003, to C. Narad, dated Apr. 4, 2005.
Office Action in corresponding matter U.S. Appl. No. 10/406,798, filed Apr. 2, 2003, to C. Narad, dated Sep. 15, 2006.
Office Action in corresponding matter U.S. Appl. No. 10/406,798, filed Apr. 2, 2003, to C. Narad, dated Dec. 7, 2006.
Office Action dated Aug. 23, 2005, for corresponding matter U.S. Appl. No. 10/323,989, filed Dec. 17, 2002, to H. Wong et al.
Office Action dated Apr. 5, 2006, for corresponding matter U.S. Appl. No. 10/323,989, filed Dec. 17, 2002, to H. Wong et al.
Office Action dated Jan. 10, 2007, for corresponding matter U.S. Appl. No. 10/323,989, filed Dec. 17, 2002, to H. Wong et al.
Office Action dated May 22, 2007, for corresponding matter U.S. Appl. No. 10/406,798, filed Apr. 2, 2003, to C. Narad et al.
Office Action dated Jun. 6, 2005, for corresponding matter U.S. Appl. No. 10/331,688, filed Dec. 30, 2002, to Edirisooriya et al.
Office Action dated Nov. 30, 2005, for corresponding matter U.S. Appl. No. 10/331,688, filed Dec. 30, 2002, to Edirisooriya et al.
Notice of Allowance dated Mar. 22, 2007, for corresponding matter U.S. Appl. No. 10/736,765, filed Dec. 16, 2003, to R. Huggahalli et al.
Notice of Allowance dated May 22, 2007, for corresponding matter U.S. Appl. No. 11,021,143, filed Dec. 22, 2004, to Balakrishnan et al.

* cited by examiner

FIGURE 7

METHOD AND APPARATUS FOR INITIATING CPU DATA PREFETCHES BY AN EXTERNAL AGENT

BACKGROUND

1. Field

The present disclosure relates generally to memory access in a computing system and, more specifically, to initiating CPU data prefetches and preprocessing by an external agent to increase the performance of memory dependent operations.

2. Description

Central Processing Units (CPUs) typically implement prefetches in hardware in order to anticipatorily fetch data into the CPU caches. This helps in reducing the latency of a memory access when the program executing on the CPU actually requires the data. Due to the prefetch, the data can be found in cache with a latency that is usually much smaller than system memory access latency. Modern prefetching hardware tracks spatial and temporal access patterns of memory accesses and issues anticipatory requests to system memory on behalf of the CPU. However, prefetching hardware associated with a CPU normally cannot be invoked by an external agent such as another CPU, a chipset or an Input/Output (I/O) device. When an external agent has new data, a typical protocol requires that all CPU caches (except the CPU who has the new data if the external agent is a CPU) invalidate their copies and read the new data from the memory when they need the new data. In other words, whenever a CPU other than the external agent needs the new data, the CPU must read the new data from the memory (or possibly from the external agent) and thus incur a much higher latency than directly reading from the CPU's own cache. As a result, the data processing speed may be slowed down due to memory access.

BRIEF DESCRIPTION OF THE DRAWINGS

The features and advantages of the present disclosure will become apparent from the following detailed description of the present disclosure in which.

DETAILED DESCRIPTION

An embodiment of the present invention comprises a method and apparatus for initiating CPU data prefetches by an external agent. In a modern computing system, there is prefetching hardware, in addition to software-implemented prefetching mechanisms, to anticipatorily fetch data into CPU caches. Such prefetching hardware can have data prefetched from a system memory into a CPU cache based on spatial and temporal access patterns of memory accesses. According to an embodiment of the present invention, functions of prefetching hardware may be expanded so that it can be invoked by an external agent such as a chipset, an I/O device, and a CPU other than the one with which the prefetching hardware associated. When an external agent has new data, the external agent may issue an independent message or "a prefetch directive" to the target CPU's prefetching hardware so that the new data may be prefetched into the target CPU's caches from the memory. In one embodiment, a prefetch directive may be sent along with existing system interconnect transactions. In another embodiment, the prefetch directive may be sent as a separate transaction. Moreover, other functions such as preprocessing the new data in addition to prefetching the new data may also be invoked.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
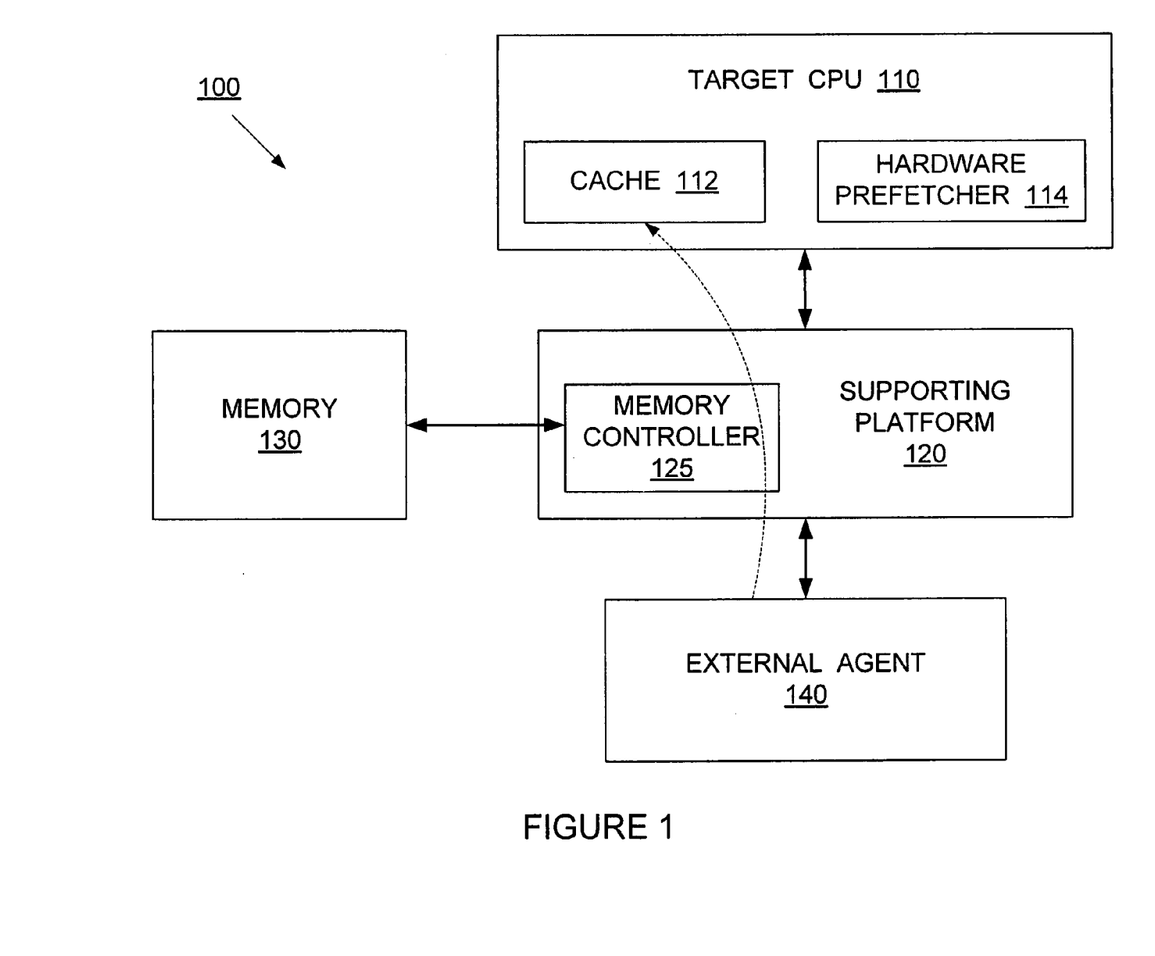
FIG. 1 is a diagram illustrating a general computing system.

FIG. 1 is a diagram illustrating a general computing system 100. The computing system 100 comprises a target CPU 110, a supporting platform 120, a memory 130, and at least one external agent 140. The target CPU may run a program that processes data from the external agent 140. The target CPU may be the only CPU or one of multiple CPUs in the computing system. The target CPU may comprise a cache 112 and a hardware prefetcher 114. The cache 112 is arranged such that the target CPU 110 can access data from this cache more efficiently than accessing the same data from the memory 130 (e.g., cache access latency is much smaller than memory access latency). The hardware prefetcher 114 may send a request to the memory 130 to anticipatorily fetch data into the cache 112 on behalf of the target CPU 110. The hardware prefetcher may issue prefetch requests based on predictable spatial and temporal access patterns of memory access by the target CPU. Although the cache 112 and the hardware prefetcher 114 are shown to be within the target CPU 110 in FIG. 1, they may be separate from each other and either of them or both may be separate from the target CPU. The external agent 140 may comprise another CPU in a multiple CPU system, and/or other devices such as a chipset and an I/O device. The external agent may provide data that is needed by a program running on the target CPU 110. The supporting platform 120 may provide necessary interfaces between the target CPU 110, the memory 130, and the external agents 140. The supporting platform may comprise a memory controller 125 to handle the I/O of data going to and from the memory 130. The supporting platform may also comprise an interface component (not shown in the figure) to facilitate data traffic between the memory and the external agent. The memory 130 may store data (including sequences of instructions) that is used by the target CPU 110 or any other device included in the system 100. Access information located in the memory 130 may be relatively slow (e.g., high latency) compared with access information located in the cache 112 by the target CPU 110.

The computing system 100 may run a cache coherency protocol under which when an external agent has new data, the external agent invalidates all copies of data that has the same memory address as the new data in all CPU's caches, including the target CPU's cache 112, and writes the new data to the memory 130 (this protocol may be called the Write-Invalidate protocol). In other words, when the source of the data is an external agent, a program running on the target CPU 110 cannot expect to find the data in its cache 112 (i.e., incurs cache misses) and has to obtain the data from the memory whenever the program needs the data. Because memory access latency is typically much higher than cache access latency, the performance of the program running on the target CPU may suffer. One approach to avoiding cache misses of data from an external agent (and thus helping improve the performance of the program running on the target CPU) is to allow the external agent to initiate data prefetches on behalf of the target CPU 110. Using this approach, when an external agent has new data, the external agent may invoke the hardware prefetcher 114 by sending a prefetch directive. Once receiving and recognizing the prefetch directive, the hardware prefetcher may issue a memory request to prefetch the new data from the memory 130 and place it into the cache 112. This approach gives an external agent direct access to the cache of the target CPU and may be called direct cache access (DCA). In one embodiment, the prefetch directive may be sent along with existing system interconnect transactions such as snoop transactions. In another embodiment, the prefetch directive may be sent as a separate transaction.

Figure 2:
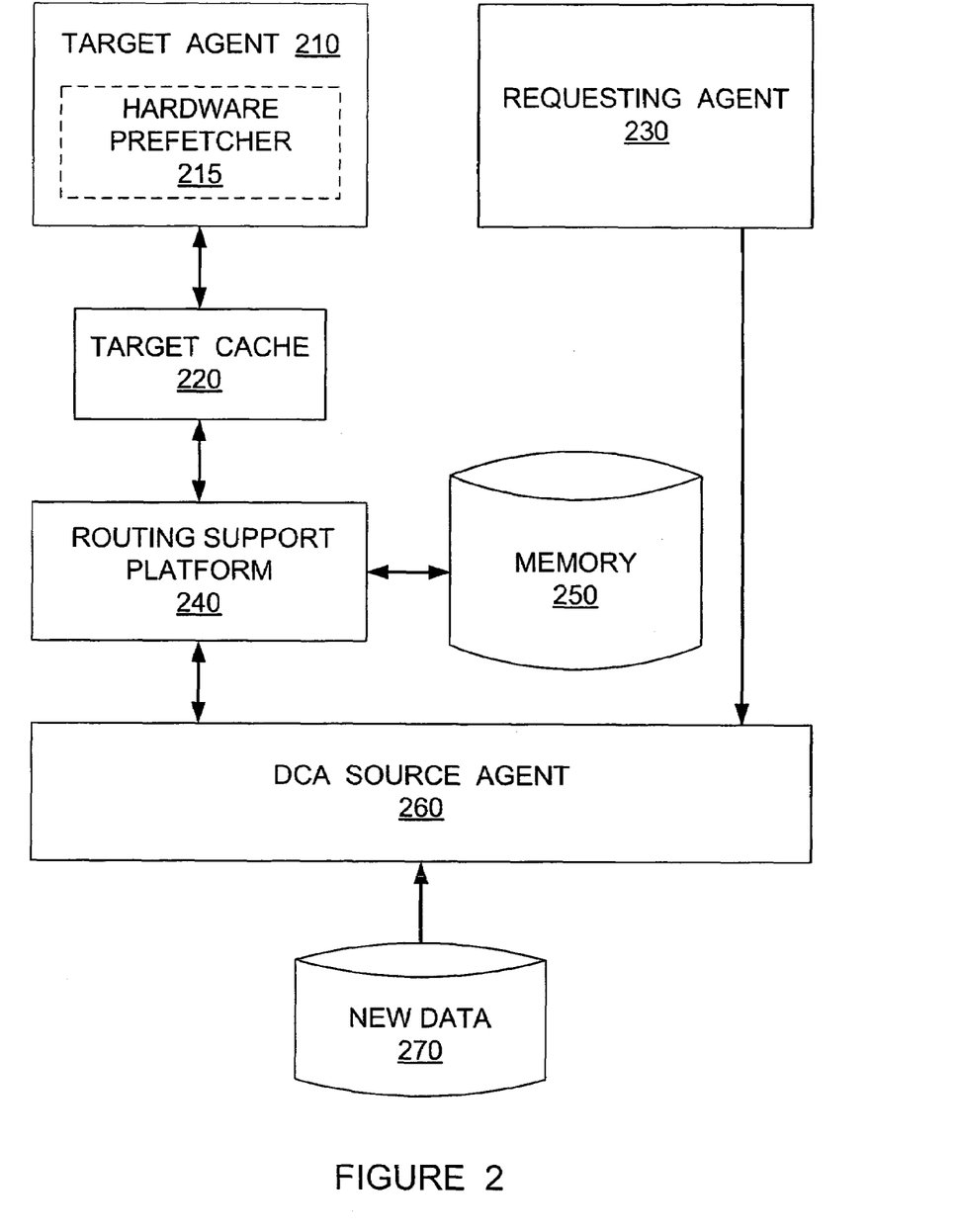
FIG. 2 is a diagram of functional components of a computing system where an external agent may initiate CPU data prefetches.

FIG. 2 is a diagram of functional components of a computing system where an external agent may initiate CPU data prefetches. The target agent 210 may be a CPU or a processor and it may run a program that needs data from the DCA source agent 260. The target agent has faster and more efficient access to the target cache 220 than access to the memory 250. The target agent comprises a hardware prefetcher 215. The hardware prefetcher 215 may anticipate subsequent memory accesses, based on past spatial and temporal memory access patterns by the target agent 210, and issue memory requests to prefetch data into the target cache 220. The hardware prefetcher may also be invoked by the DCA source agent 260 so that new data received by or generated by the DCA source agent may be prefetched into the target cache. The target cache 220 stores at least a portion of data needed by programs running on the target agent. In one embodiment, the target cache may be associated with the target agent. In another embodiment, the target cache may be any cache in the system. The target cache is implemented such that the target agent can access data from this cache more efficiently than accessing the same data from the memory 250. In one embodiment, the target agent 210, the hardware prefetcher 215, and the target cache 220 may be physically separated from each other. In another embodiment, these three components may be physically coupled to each other. In another embodiment, any two of them may be physically coupled to each other but physically separated from the third one. Yet in another embodiment, either the hardware prefetcher 215 or the target cache 220, or both may physically be a part of the target agent 210.

The requesting agent 230 may be a CPU or a processor running an operating system (OS) or equivalent software that will or is highly likely to process the new data 270 and has knowledge of properties of the new data. The properties of the new data may comprise a memory address and DCA preferences. The memory address indicates where data from an I/O device or other devices is placed in memory. The DCA preferences may include a DCA enablement indicator, a target identifier and target cache placement attributes. The DCA enablement indicator indicates that the new data from the DCA source agent can be prefetched into a cache of a target agent; the target identifier identifies the cache of the target agent; and target placement attributes indicate how the new data is placed in the cache of the target agent. The requesting agent may be different from or the same as the target agent.

The routing support platform 240 provides the necessary support for DCA transactions to route data to the target cache 220 and also to ensure coherency between the target cache and the memory 250. The routing support platform may be a chipset that bridges DCA source agents (e.g., DCA source agent 260) and CPUs (e.g., target agent 210). The routing support platform 240 may comprise a memory controller to handle the I/O of data going to and from the memory 250. The memory 250 may store data (including sequences of instructions) that are used by the target agent 210, the DCA source agent 260 and/or any other device included in the system. In one embodiment, the memory controller may be a part of the routing support platform. In another embodiment, the memory controller may be a part of the target agent. Additionally, the routing support platform may be separated from the DCA source agent, but they may also be combined or coupled together. For example, a chipset may also be a source of new data and may also initiate data prefetches to a cache of a target agent.

The computing system shown in FIG. 2 may comprise a DCA source agent 260. Although FIG. 2 only shows one DCA source agent, there may be multiple more DCA source agents in the computing system. The DCA source agent 260 may comprise an I/O adapter, a network interface controller, or a disk adapter. The requesting agent 230 sends properties of the new data to the DCA source agent for the DCA source agent to use when it has new data 270. If the DCA enablement indicator indicates that the DCA function is enabled, the DCA source agent may directly send the new data to the target cache 220 while maintaining the coherency among different caches in the system in one embodiment. In another embodiment, the routing support platform 240 acting on behalf of the DCA source agent, may initiate coherency transactions such as snoops to ensure that all copies of data having the same memory address as the new data in all CPU caches, including the target cache 220, are invalidated ("invalidate transaction"). The CPU's response to an invalidate transaction depends on the state of the cache line (where the copy of data having the same memory address as the new data is placed) in its caches. If the cache line is in a Modified (M) state in any of the CPU's caches, then the data is evicted (write-back) from the CPU caches to the memory. The memory controller merges the CPU write-back with the write transaction (for writing the new data from the DCA source agent to the memory) and sends the merged data to the memory. If the write transaction is a full cache-line write, then the CPU write-back can be ignored. If the write transaction is a partial cache-line transaction, then it is merged with the full cache-line evicted by the CPU. The CPU write-back may not occur if the cache line is not found to be in the M state in a CPU's cache.

In addition to initiating an invalidate transaction, the DCA source agent may also create a prefetch directive encoding the DCA preferences received from the requesting agent and issue the prefetch directive to all CPUs with the help from the routing support platform 240. In one embodiment, the prefetch directive may be sent along with the invalidate transaction. In another embodiment, the prefetch directive may be sent as a separate independent transaction. Once the hardware prefetcher 215, associated with the target agent, receives and recognizes the prefetch directive, the hardware prefetcher may issue a request to the memory to prefetch the new data 270 to the target cache 220 according to the DCA preferences of the new data. Thereafter, the target agent may read the new data directly from the target cache rather than from the memory for a running program, and thus reduce data read latency and improve the performance of the running program.

Furthermore, the hardware prefetcher 215 may pre-process the new data prior to making the data available in the target cache 220, according to instructions of the prefetch directive. Instructions to pre-process the data may be encoded in the DCA preferences which are a part of the prefetch directive. The pre-processing selection provides flexibility in converting the prefetched data into a new format before delivering the data to a cache. Such pre-processing may comprise any type of data processing such as, for example, decoding, decompressing, decrypting, etc.

Figure 3:
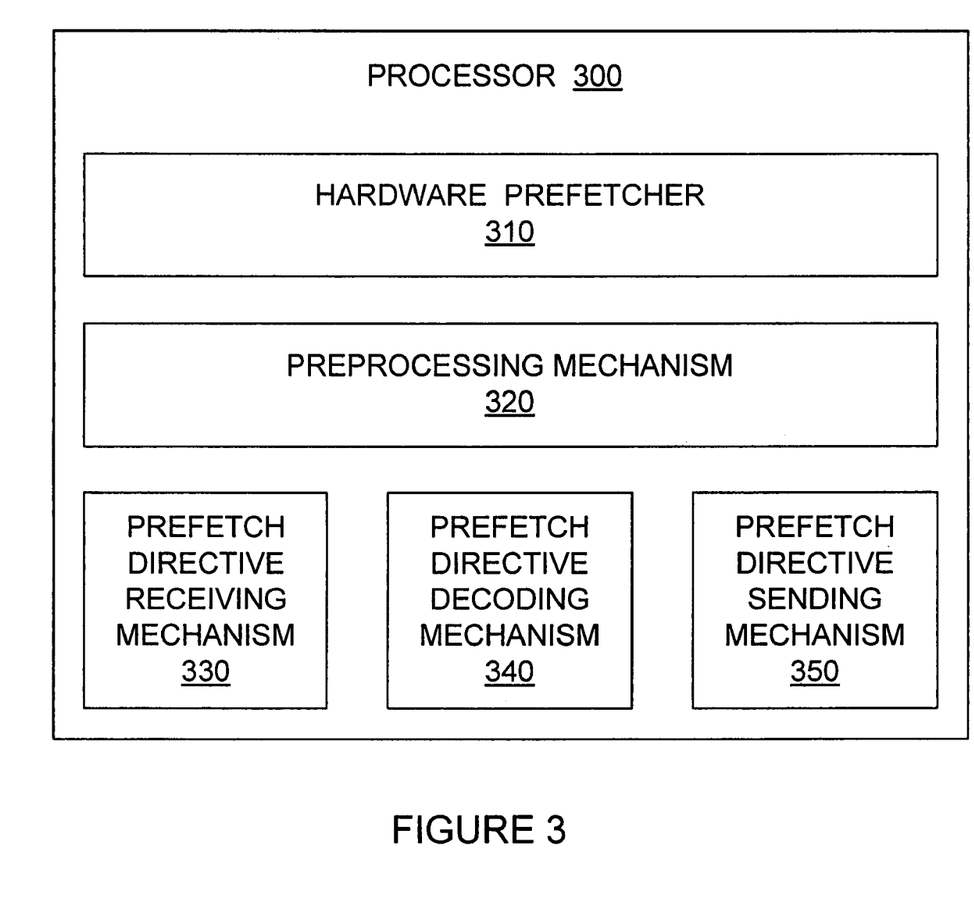
FIG. 3 is a diagram of a processor to which an external agent may initiate data prefetches.

FIG. 3 is a diagram of a processor 300 which may act as a target agent 210 as shown in FIG. 2. The processor 300 may also act as an external agent (e.g., in a multiple processor computing system). The processor 300 may comprise one or more processing cores (not shown in FIG. 3). Each processing core may have its own cache associated with it, or more than one processing cores may share one or more caches. In one embodiment, a cache for a processing core may be physically integrated with the processing core and located within the processor 300. In another embodiment, a cache for a processing core may be physically separate from the processing core and may be located inside or outside the processor 300. The processor 300 may comprise a hardware prefetcher 310. The hardware prefetcher 310 may anticipate subsequent memory accesses, based on past spatial and temporal memory access patterns by processing cores of the processor 300, and issue memory requests to prefetch data into a cache of a requesting processing core. The processor 300 may also comprise a prefetch directive receiving mechanism 330 to recognize and receive a prefetch directive issued by an external agent (e.g., a DCA source agent 260 as shown in FIG. 2) when the external agent has new data needed by one or more processing cores in the processor 300, when the processor 300 acts as a target agent. The prefetch directive may be sent to the processor 300 along with an invalidate transaction or as a separate transaction.

Once a prefetch directive is received by the prefetch directive receiving mechanism 330, the prefetch directive may be passed to a prefetch directive decoding mechanism 340 to decode information included in the prefetch directive. A prefetch directive may comprise at least a memory address and a destination (e.g., a specific processing core's cache) of data to be prefetched. The prefetch directive decoding mechanism may pass the decoded information to the hardware prefetcher 310 so that the hardware prefetcher may prefetch the data from the memory into the receiving cache based on the memory address and the destination information provided by the prefetch directive decoding mechanism 320. The prefetch directive may also include information to require that the prefetched data be first preprocessed (e.g., decrypting, decoding, decompressing, downsampling, etc.) before delivering the data to the receiving cache. The processor may comprise a preprocessing mechanism 320 to pre-process the prefetched data according to information included in the prefetch directive.

Furthermore, the processor 300 may also comprise a prefetch directive sending mechanism 350 to send a prefetch directive to a target agent when the processor 300 acts as an external agent which has new data that is needed by the target agent. The prefetch directive may be sent to the target agent along with a coherency transaction (e.g., invalidate) or as a separate transaction. Although not shown in FIG. 3, the processor 300 may further comprise a mechanism to create a prefetch directive when the processor has new data which needs to be sent to a cache of a target agent.

Figure 4:
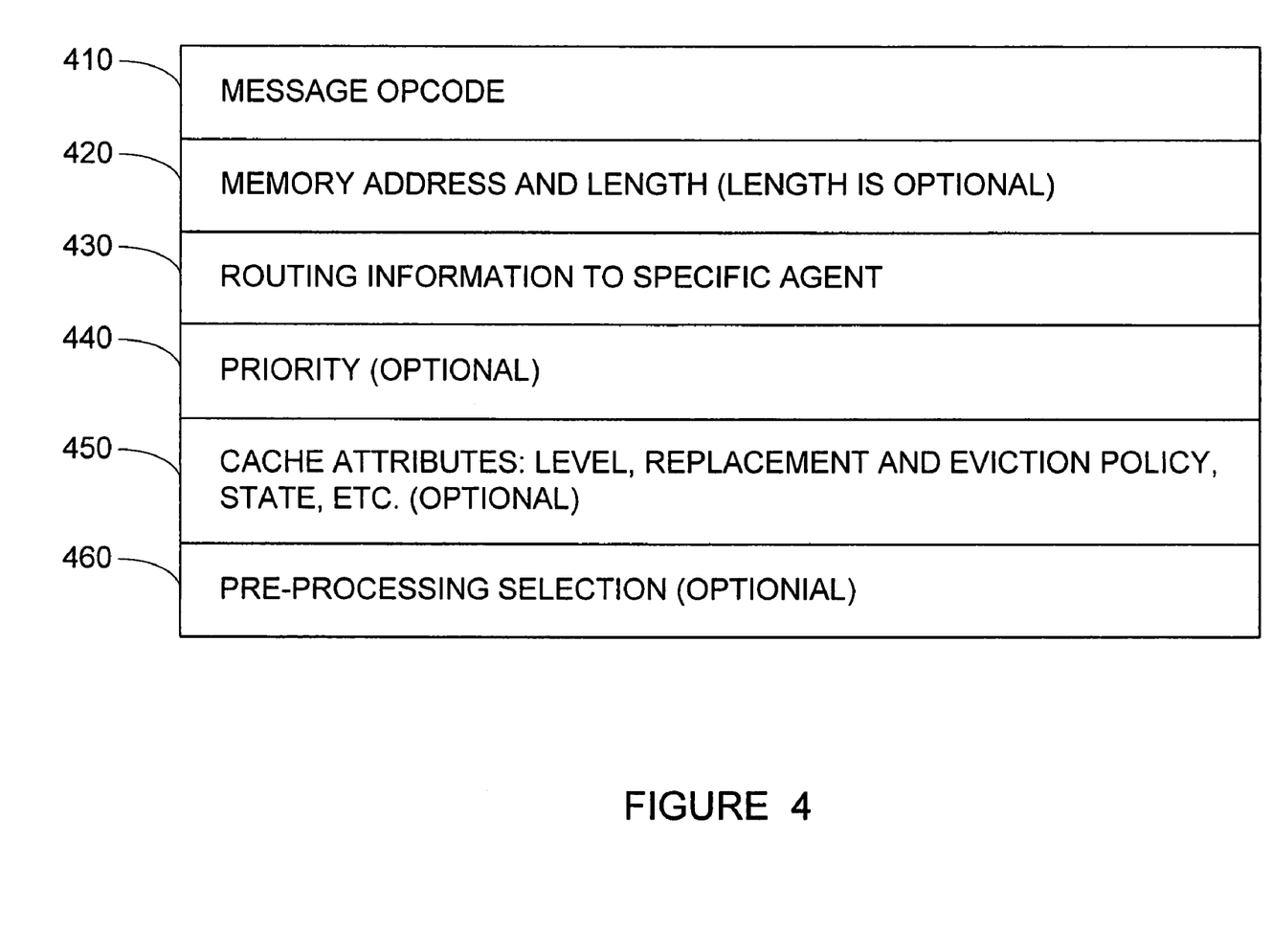
FIG. 4 is a table illustrating an example format of a prefetch directive used for initiating CPU data prefetches by an external agent in a computing system.

FIG. 4 is a table illustrating an example format of a prefetch directive used for initiating CPU data prefetches by an external agent in a computing system. A prefetch directive may comprise multiple fields (e.g., 6 fields in this example). Field 410 may include a message opcode to identify a message as a prefetch directive. Field 420 may include a memory address, which is the base address from which data is to be prefetched. Field 420 may also include the length of data, which is the number of bytes that is to be prefetched starting from the base address. The length of data may be optional since a default value (e.g., a single cache line) may be used. Field 430 may include routing information, which may involve an identification of a target cache or a target processing core in a target agent ("target ID") and any other information to permit the system to route the prefetch directive to the target. Field 440 may include optional priority information of the prefetch request issued by a hardware prefetcher. Since prefetches do not affect any architectural state, they may be randomly ignored by the hardware prefetcher in order to control system congestion. For some applications that require certain levels of performance (e.g., quality of service), the prefetch directive may request one of the highest priority so the prefetch request will at least not be fully ignored. Field 450 may include optional cache attributes, which may permit selection of a cache level if a hierarchy is present and may also control how the prefetched block of data will replace existing data in the cache and the state of the new blocks after brought into the cache. Field 460 may include optional pre-processing instructions, which instruct a hardware prefetcher to initiate required pre-processing before delivering the data into a cache. Although the example format of a prefetch directive as shown in FIG. 4 may comprise six fields, the number of fields, the size of each field, and interpretation of each field may depend on each implementation. A person of ordinary skill in the art may readily come up with modified formats for specific implementations, which are deemed to lie within the spirit and scope of this disclosed example.

Figure 5:
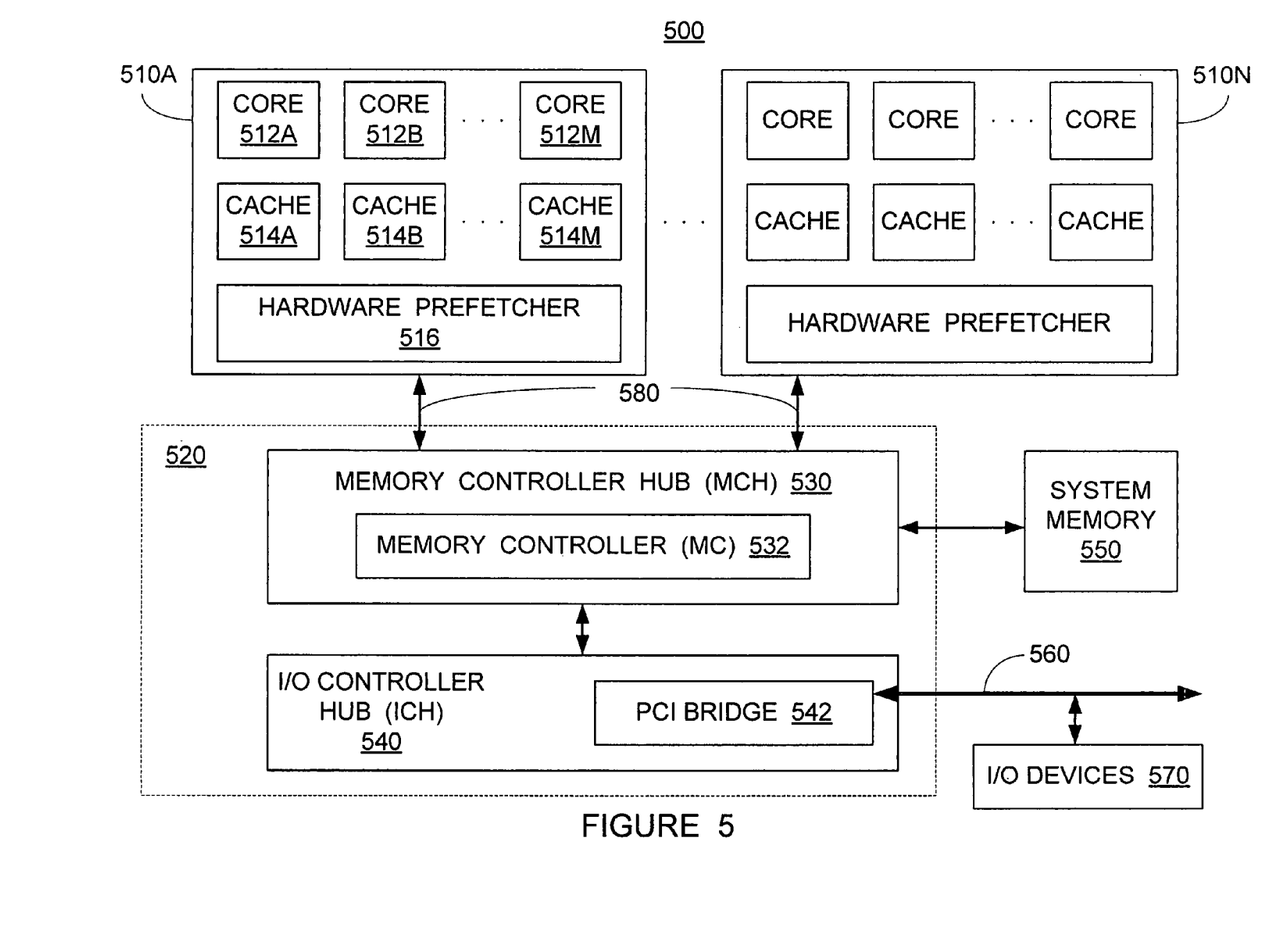
FIG. 5 is a diagram illustrating one example computing system where an external agent may be allowed to initiate CPU data prefetches.

FIG. 5 is a diagram illustrating one example computing system 500 where an external agent may be allowed to initiate CPU data prefetches. The computing system 500 comprises N processors (where N is a positive integer), 510A, . . . , 510N, a chipset 520, a system memory 550, a Peripheral Component Interconnect (PCI) bus 560, and at least one I/O device 570 connected to the PCI bus. Each processor (e.g., 510A) may comprise one or more processing cores, 512A, 512B, . . . , 512M. Each processing core may run a program which needs data from another processor (e.g., processor 510N) and/or other devices (e.g., I/O device 570). In one embodiment, each processing core may have its own cache such as 514A, 514B, . . . , 512M as shown in the figure. In another embodiment, some or all of the processing cores may share a cache. Typically, a processing core can access data in its cache more efficiently than it accesses data in the system memory 550. Each processor (e.g., 510A) may also comprise a hardware prefetcher (e.g., 516 for processor 510A) to anticipatorily fetch data from the system memory to a cache associated with one or more of its processing core(s) based on spatial and temporal memory access patterns by this/these processing core(s).

The chipset 520 may further comprise a memory controller hub (MCH) 530 and an I/O controller hub (ICH) 540. The MCH 530 may include a memory controller 532 that is coupled to a system memory 550 to control traffic to/from the system memory. The system memory 550 may store data, including sequences of instructions that are executed by processors or any other device included in the system 500. The MCH 530 may be coupled to the ICH 540 via a hub interface. The ICH 540 provides an interface to input/output (I/O) devices in the system. The ICH 540 may include a PCI bridge 542 that provides an interface to a Peripheral Component Interconnect (PCI) bus 560. The PCI Bridge 542 may provide a data path between the processor 510 and I/O devices 570 (e.g., an audio device and a disk drive). Although not shown, other devices may also be coupled to the PCI bus 560 and the ICH 540.

A hardware prefetcher of a processor (e.g., 516 inside processor 510A) may also be invoked by an external agent (e.g., another processor and/or an I/O device). When the external agent has new data which is needed for a target processing core (e.g., 512B) to execute a program, the external agent may send a prefetch directive to all processors. The prefetch directive encodes the identification of the target processing core ("target core ID"). The target core ID is included in properties of the new data, which are sent to the external agent by a requesting agent. The requesting agent may be the same as the target core or any other processing cores inside a processor, which is the same as or different from the one where the target core is located. The requesting agent may run an operating system (OS) or other software and has the knowledge of how the new data is to be routed and processed. When the hardware prefetcher associated with the target processing core ("target hardware prefetcher") receives the prefetch directive and recognizes the identification of the target processing core, it issues a request to the system memory to prefetch the new data to the cache associated with the target processing core. Using a prefetch directive allows direct local cache access by an external agent. As a result, the target processing core may read the new data directly from its cache instead of the system memory. Moreover, a prefetch directive may instruct a hardware prefetcher to first pre-process the new data before delivering it into the target cache.

A processor (e.g., 510A) and the chipset 520 may be connected through a front side bus (FSB) 580. Direct access to a cache by an external agent may be supported on the FSB by extending the existing Bus-Read-Invalidate-Line (BRIL) transaction protocol. An FSB agent (e.g., a processor, a chipset, or an I/O device) uses a BRIL transaction when it has the intention to modify a cache-line. A non-zero length BRIL (BRIL) is used by an agent to read a full cache-line from its current location (either a processor's cache or the system memory) into the agent's cache with the cache state in Exclusive. A zero length BRIL (BRIL.0 or BIL) is used by an agent that already has the cache-line in a shared state and the agent now intends to modify the cache line. BIL transactions may also be used by the chipset to invalidate previous copies of the cache lines in processor caches, when I/O devices write to cache coherent memory. A prefetch directive may be sent along with a BIL transaction ("modified BIL transaction"). When receiving the modified BIL transaction, all processors will invalidate data in their caches, which has the same address as the new data received by an agent external to the receiving processor, and either discard the data or write it back to the system memory. Because the prefetch directive has the identification of the target core of the target processor or the target cache where the new data will be sent, the hardware prefetcher in the target processor will recognize the prefetch directive and issue a request to the system memory to prefetch the new data. Alternatively, a prefetch directive may be sent as an interconnection transaction separate from the FSB protocol. Using this alternative approach, a prefetch directive may be sent at any time between the time when an external agent has new data and the time when the new data is read by a target core of a processor.

Figure 6:
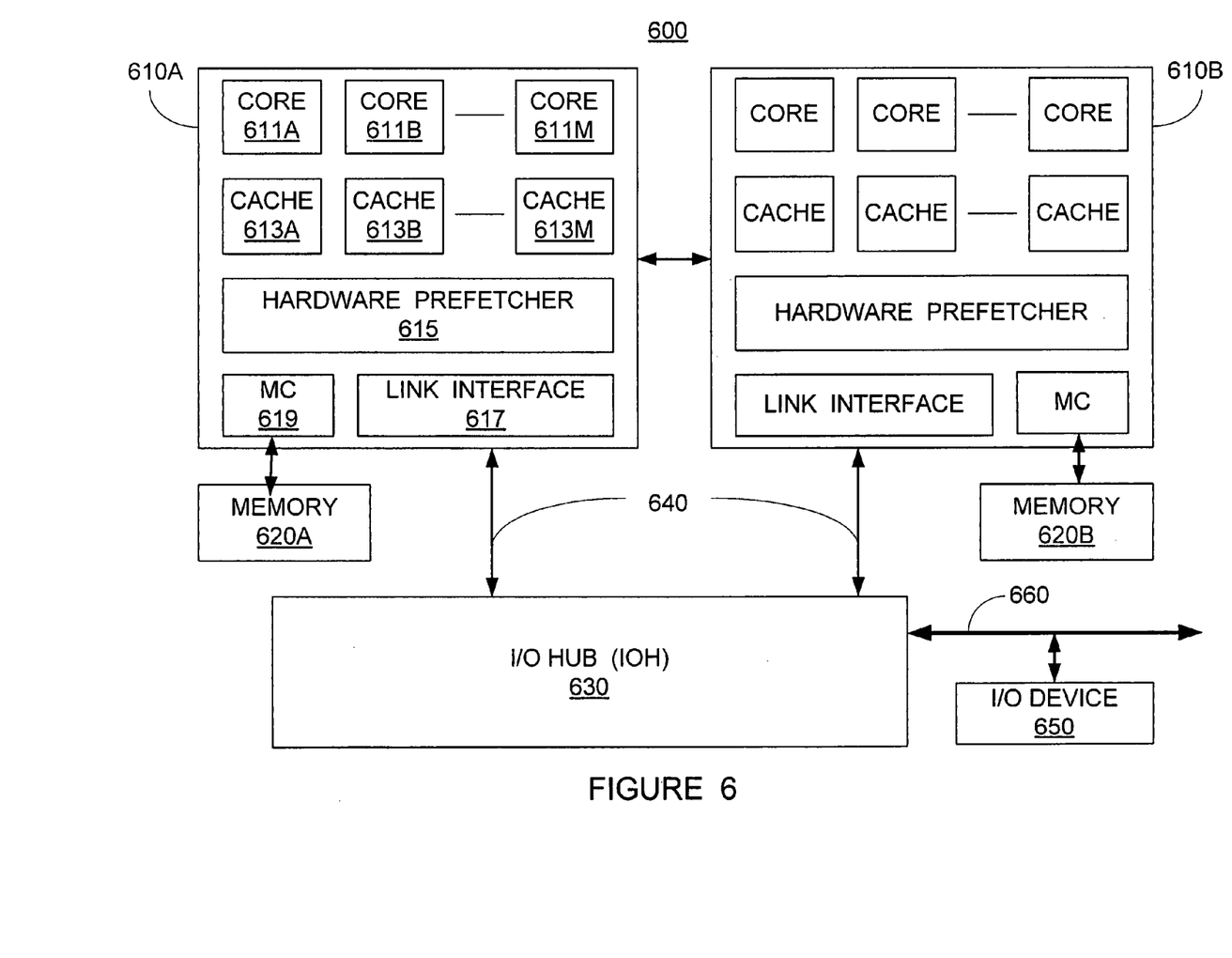
FIG. 6 is a diagram illustrating another example computing system where an external agent may be allowed to initiate CPU data prefetches.

FIG. 6 is a diagram illustrating another example computing system 600 where an external agent may be allowed to initiate CPU data prefetches. The computing system 600 comprises two processors 610A and 610B, an I/O hub (IOH) 630, memories 620A and 620B, a Peripheral Component Interconnect (PCI) bus 660, and at least one I/O device 650 connected to the PCI bus. Each processor (e.g., 610A) may comprise one or more processing cores, 611A, 611B, ..., 611M. Each processing core may run a program which needs data from another processor (e.g., processor 610B) and/or other devices (e.g., I/O device 650). In one embodiment, each processing core may have its own cache such as 613A, 613B, ..., 613M as shown in the figure. In another embodiment, some or all of the processing cores may share a cache. Typically, a processing core can access data in its cache more efficiently than it accesses data in the memory 620A or 620B. Each processor (e.g., 610A) may also comprise a hardware prefetcher (e.g., 615 for processor 610A) to anticipatorily fetch data from memory 620A to a cache associated with one or more of its processing core(s) based on spatial and temporal memory access patterns by this/these processing core(s). A processor (e.g., 610A) may further comprise a memory controller (e.g., 619) coupled to a memory (e.g., 620A) to control traffic to/from the memory. Additionally, a processor may comprise a link interface 617 to provide point-to-point connections between the processor and the IOH 630. Although the figure only shows two processors, the system 600 may comprise only one processor or more than two processors.

The memories 620A and 620B both store data, including sequences of instructions that are executed by processors or any other device included in the system 600. The IOH 630 provides an interface to input/output (I/O) devices in the system. The IOH may be coupled to a Peripheral Component Interconnect (PCI) bus 660. The I/O device 650 may be connected to the PCI bus. Although not shown, other devices may also be coupled to the PCI bus and the ICH.

Similar to the system 500 as shown in FIG. 5, a hardware prefetcher of a processor (e.g., 615 inside processor 610A) may also be invoked by an external agent (e.g., another processor and/or an I/O device) to allow direct access to a local cache by the external agent through the use of a prefetch directive. Such direct access may be supported on the point-to-point connections between the processors and the IOH by modifying point-to-point connection based coherency transactions so that a prefetch directive may be sent along with such transactions (e.g., an invalidate transaction). Alternatively, a prefetch directive may be sent as an interconnection transaction separate from the point-to-point connection based coherency protocol.

Figure 7:
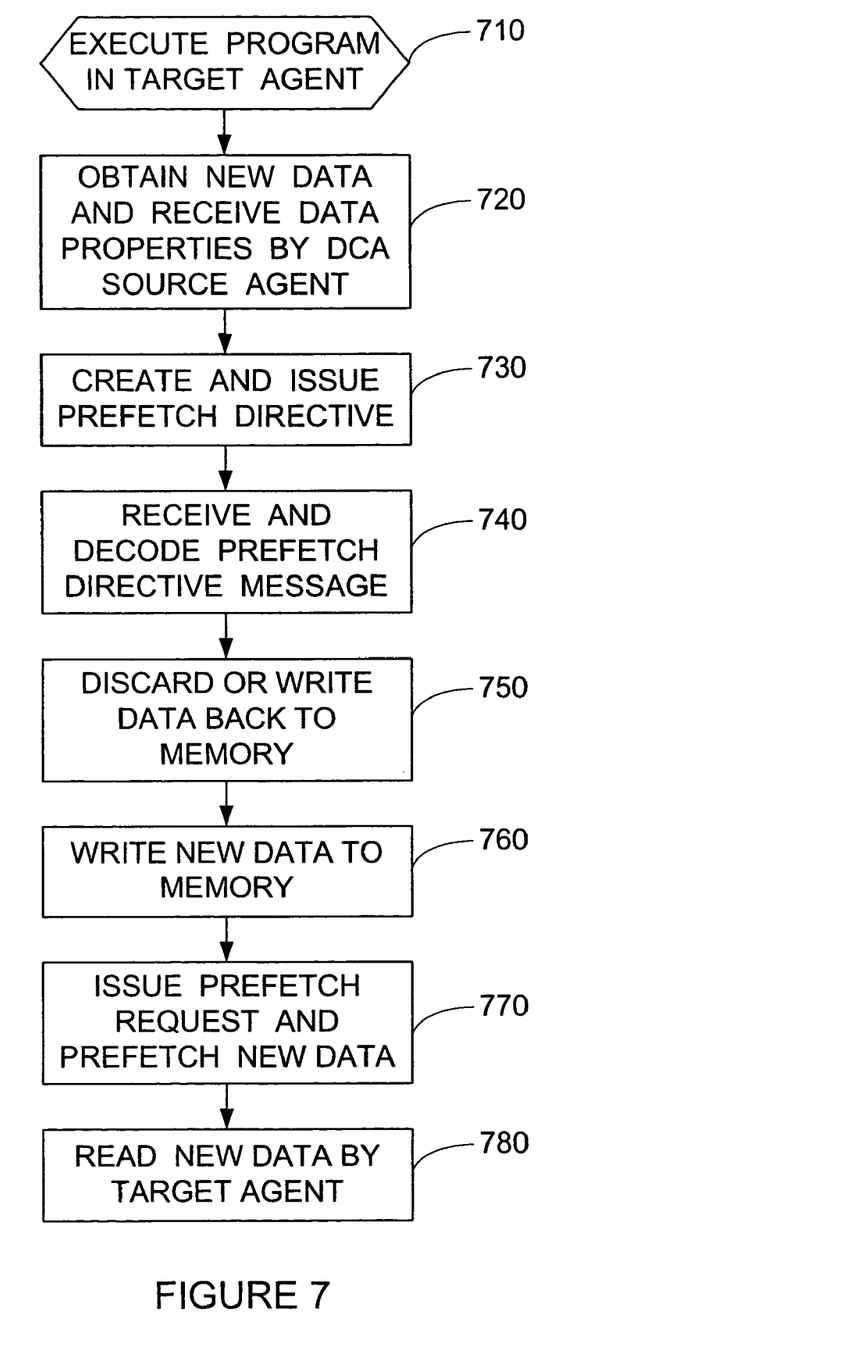
FIG. 7 is a flow chart illustrating an example process of initiating CPU data prefetches by an external agent in a computing system.

FIG. 7 is a flow chart illustrating an example process of initiating CPU data prefetches by an external agent in a computing system. In block 710, a target agent (e.g., a processing core in a processor) may run a program that may use data coming from a DCA source agent (e.g., an I/O device, another processor, or a chipset). In block 720, the DCA source agent may receive or generate new data. Also in block 720, a requesting agent may send the DCA source agent properties of the new data including a memory address and DCA preferences. In block 730, a prefetch directive encoding the DCA preferences of the new data may be created and sent to the target agent as well as other processors by the DCA source agent. In one embodiment, the prefetch directive may be sent along with an invalidate transaction, which is part of cache coherency transactions. For example, the prefetch directive may be sent along with an invalidate transaction as a hint. The hint will be received and recognized by the hardware prefetcher associated with the target agent so that the hardware prefetcher may issue a prefetch request to the system memory. In another embodiment, the prefetch directive may be sent as a separate transaction. Since the prefetch directive has information about the target agent, the prefetch directive, as a separate transaction, may be sent directly to the target agent. Additionally, the prefetch directive, as a separate transaction, may be sent at any time after the DCA agent has the new data and before the target agent reads the new data.

In block 740, the prefetch directive may be received and recognized by the hardware prefetcher associated with the target agent. In block 750, copies of data, which have the same memory address as the new data in the DCA source agent, in all coherency caches may be discarded or written back to the memory. Memory write back occurs when the write transaction (for writing the new data from the DCA source agent to the memory) is a partial cache-line transaction and the data in the cache is in modified state. In this situation, the write transaction is merged with the full cache-line evicted by the CPU. In block 760, the new data may be written to the memory. The new data may be merged with the data evicted from a target cache and the merged data is written to the memory. In block 770, the hardware prefetcher associated with the target agent may issue a request to the memory to prefetch the new data (or merged data) to the target cache. If the prefetch directive includes preprocessing instructions, the new data (or merged data) is preprocessed according to the instructions before being delivered into the target cache. In block 780, the target agent may read the new data (or merged data) from the target cache.

Although blocks in FIG. 7 are shown in this specific order, such an order is used only for the convenience of illustration. In each different embodiment, the order of the blocks may be different. By way of example, when the prefetch directive may be created and sent as a separate transaction, it may be sent at any time before the new data is read by the target agent (but after the DCA agent has the new data). Also, the target agent may execute the program through the entire process shown in FIG. 3 without limited to block 710 only. Moreover, blocks in FIG. 3 may be combined, split, or re-ordered to achiever the same result.

Although an example embodiment of the disclosed techniques is described with reference to diagrams in FIGS. 1-7, persons of ordinary skill in the art will readily appreciate that many other methods of implementing the present invention may alternatively be used. For example, the order of execution of the functional blocks or process procedures may be changed, and/or some of the functional blocks or process procedures described may be changed, eliminated, or combined.

In the preceding description, various aspects of the present disclosure have been described. For purposes of explanation, specific numbers, systems and configurations were set forth in order to provide a thorough understanding of the present disclosure. However, it is apparent to one skilled in the art having the benefit of this disclosure that the present disclosure may be practiced without the specific details. In other instances, well-known features, components, or modules were omitted, simplified, combined, or split in order not to obscure the present disclosure.

The disclosed techniques may have various design representations or formats for simulation, emulation, and fabrication of a design. Data representing a design may represent the design in a number of manners. First, as is useful in simulations, the hardware may be represented using a hardware description language or another functional description language which essentially provides a computerized model of how the designed hardware is expected to perform. The hardware model may be stored in a storage medium such as a computer memory so that the model may be simulated using simulation software that applies a particular test suite to the hardware model to determine if it indeed functions as intended. In some embodiments, the simulation software is not recorded, captured, or contained in the medium.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, re-configurable hardware is another embodiment that may involve a machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a computer readable medium or device (e.g., hard disk drive, floppy disk drive, read only memory (ROM), CD-ROM device, flash memory device, digital versatile disk (DVD), or other storage device). Embodiments of the disclosed techniques may also be considered to be implemented as a machine-readable storage medium storing bits describing the design or the particular part of the design. The storage medium may be sold in and of itself or used by others for further design or fabrication.

While this disclosure has been described with reference to illustrative embodiments, this description is not intended to be construed in a limiting sense. Various modifications of the illustrative embodiments, as well as other embodiments of the disclosure, which are apparent to persons skilled in the art to which the disclosure pertains are deemed to lie within the spirit and scope of the disclosure.

What is claimed is:

1. An apparatus for initiating CPU data prefetches, comprising:
    a target agent to execute a program;
    an external source agent to supply at least a portion of data for the target agent to execute the program, and when having new data, to create and issue a prefetch directive; and a hardware prefetcher associated with the target agent to issue a request to prefetch the new data from a memory to a target cache when the prefetch directive is received.

2. The apparatus of claim 1, wherein the target cache stores at least a portion of data needed for the target agent to execute the program.

3. The apparatus of claim 1, wherein the memory stores data used by at least one of the target agent and the external source agent.

4. The apparatus of claim 1, further comprising a routing support platform to facilitate routing of the prefetch directive from the external source agent to the target agent and data passage among the target agent, the target cache, the data source agent, and the memory.

5. The apparatus of claim 1, wherein the target agent has faster access to data in the target cache than to data in the memory.

6. The apparatus of claim 1, wherein the prefetch directive is sent to agents including at least the target agent along with interconnection transactions existing at least between the target agent and the external source agent.

7. The apparatus of claim 1, wherein the prefetch directive is sent as a separate transaction to agents, including at least the target agent.

8. The apparatus of claim 7, wherein the prefetch directive is sent to at least the target agent at least one of when the external source agent has the new data, and after the external source agent has the new data but before the target agent reads the new data.

9. The apparatus of claim 1, further comprising a requesting agent to send properties of the new data to the external source agent.

10. The apparatus of claim 9, wherein the properties of the new data comprise memory address and direct cache access (DCA) preferences, the DCA preferences including a DCA enablement indicator, an identification of at least one of the target agent and the target cache, and target cache replacement attributes.

11. The apparatus of claim 1, wherein the prefetch directive comprises:
a message opcode to identify the prefetch directive;
a source address to indicate where in the memory data is to be prefetched; and
routing information to help route the prefetch directive to the hardware prefetcher and route data to at least one of the memory and the target cache.

12. The apparatus of claim 11, wherein the prefetch directive further comprises preprocessing information to instruct the hardware prefetcher to preprocess the prefetched data before delivering the data into the target cache.

13. The apparatus of claim 11, wherein the prefetch directive further comprises attributes indicating at least one of the level of the target cache that receives the prefetched data, the replacement and eviction policy of the cache, and the state of a new data block placed in the cache.

14. The apparatus of claim 1 is represented by data stored in a computer readable medium, the data comprising a functional description of the apparatus.

15. The apparatus of claim 14, wherein the data representing the apparatus comprises a hardware description language code.

16. The apparatus of claim 14, wherein the data representing the apparatus comprises data representing a plurality of mask layers string physical data representing the presence or absence of material at various locations of each of the plurality of mask layers.

17. A method for initiating CPU data prefetches, comprising:
executing a program by a target agent;
obtaining new data by an external source agent, the new data needed for the target agent to run the program;
creating and issuing a prefetch directive when the new data is obtained by the external source agent; and
issuing a request to prefetch the new data into a target cache, when the prefetch directive is received.

18. The method of claim 17, further comprising receiving properties of the new data, the properties comprising memory address and direct cache access (DCA) preferences, the DCA preferences including a DCA enablement indicator, an identification of at least one of the target agent and the target cache, and target cache replacement attributes.

19. The method of claim 17, wherein the target cache stores at least a portion of data needed for the target agent to execute the program, the target agent has faster access to data in the target cache than access to data in a memory that stores data used by at least one of the target agent and the external source agent.

20. The method of claim 17, further comprising writing the new data into a memory.

21. The method of claim 17, further comprising sending the prefetch directive to agents including at least the target agent along with interconnection transactions existing at least between the target agent and the external source agent.

22. The method of claim 17, further comprising preprocessing the prefetched data according to instructions included in the prefetch directive before delivering the data into the target cache and reading the new data from the target cache by the target agent.

23. The method of claim 17, further comprising sending the prefetch directive as a separate transaction to agents, including at least the target agent.

24. The method of claim 23, further comprising sending the prefetch directive to at least the target agent at least one of when the external source agent has the new data, and after the external source agent has the new data but before the target agent reads the new data.

25. The method of claim 17, wherein the prefetch directive comprises:
a message opcode to identify the prefetch directive;
a source address to indicate where in the memory data is to be prefetched; and
routing information to help route the prefetch directive to the hardware prefetcher and route data to at least one of the memory and the target cache.

26. The method of claim 25, wherein the prefetch directive further comprises attributes indicating at least one of the level of the target cache that receives the prefetched data, the replacement and eviction policy of the cache, and the state of a new data block placed in the cache.

27. An article comprising a machine readable medium having stored thereon a prefetch directive, the prefetch directive comprising:
a first field including a message opcode to identify the prefetch directive;
a second field including a source address to indicate where in the memory data is to be prefetched; and
a third field including routing information to help route the prefetch directive to a target and data to at least one of a memory and a target cache, the target associated with the target cache.

28. The article of claim 27, wherein the prefetch directive further comprises preprocessing information to instruct the target to preprocess the prefetched data before delivering the data into the target cache.

29. The article of claim 27, wherein the prefetch directive further comprises attributes indicating at least one of the level of the target cache that receives the prefetched data, the replacement and eviction policy of the cache, and the state of a new data block placed in the cache.

30. The article of claim 27, wherein the target receives and recognizes the prefetch directive and issues a request to the memory to prefetch the data from the memory to the target cache.

31. A processor, comprising:
a prefetcher to fetch data; and
a prefetch directive receiving mechanism, coupled to the prefetcher, to recognize and receive an external prefetch directive message from another agent, the external prefetch directive message indicating a first address and signaling to the prefetcher to cause the prefetcher to fetch data associated with the first address.

32. The processor of claim 31, further comprising a prefetch directive decoding mechanism, coupled to the prefetcher and the prefetch directive receiving mechanism, to decode information included in the external prefetch directive message.

33. The processor of claim 31, further comprising a preprocessing mechanism to preprocess the fetched data according to information included the external prefetch directive message before delivering the fetched data to a receiving cache of the processor.

34. The processor of claim 31, wherein the prefetcher fetches data associated with the first address from a memory, the first address being a memory address of the data.

35. The processor of claim 31, further comprising a prefetch directive sending mechanism to send an external prefetch directive message when the processor has data to send to a target agent.

36. The processor of claim 31, wherein the external prefetch directive message comprises:
a message opcode to identify the external prefetch directive message;
a source address to indicate where in the memory the data is to be prefetched; and
routing information to help route the external prefetch directive message to the prefetcher and route the data to a receiving cache of the processor.

37. The processor of claim 36, wherein the external prefetch directive message further comprises preprocessing information to instruct the prefetcher to preprocess the fetched data before delivering the data into the receiving cache.

38. The processor of claim 36, wherein the external prefetch directive message further comprises attributes indicating at least one of the level of the receiving cache, the replacement and eviction policy of the receiving cache, and the state of a new data block placed in the receiving cache.

39. A computing system, comprising:
a target processor to execute a program;
an external agent to supply at least a portion of data for the target agent to execute the program, and when having new data, to initiate data prefetch from a memory to a cache, the cache associated with the target processor; and
a supporting platform to provide interfaces between the target processor and the external agent and to facilitate data move among the target processor, the external agent, the cache, and the memory;
wherein the target processor has faster access to data in the cache than access to data in the memory.

40. The computing system of claim 39, wherein the external agent initiates a data prefetch from the memory to the cache by creating and issuing a prefetch directive.

41. The computing system of claim 39, wherein the external agent comprises another processor in the computing system.

42. The computing system of claim 39, wherein the external agent comprises a chipset in the computing system.

43. The computing system of claim 39, wherein the external agent comprises an I/O device, the 110 device being at least one of included in the computing system and coupled to the computing system.

44. The computing system of claim 39, further comprising a hardware prefetcher, associated with the target processor, to issue a request to prefetch the new data from the memory to the cache when receiving and recognizing the prefetch directive.

45. The computing system of claim 39, wherein the prefetch directive is sent to agents including at least the target processor along with interconnection transactions existing at least between the target processor and the external agent.

46. The computing system of claim 39, wherein the prefetch directive is sent as a separate transaction to agents, including at least the target processor.

47. The computing system of claim 39, wherein the prefetch directive is sent to at least the target processor at least one of when the external agent has the new data, and after the external agent has the new data but before the target processor reads the new data.

48. The computing system of claim 39, wherein the prefetch directive comprises:
a message opcode to identify the prefetch directive;
a source address to indicate where in the memory data is to be prefetched; and
routing information to help route the prefetch directive to a hardware prefetcher and route data to at least one of the memory and the cache.

49. The computing system of claim 48, wherein the prefetch directive further comprises preprocessing information to instruct the hardware prefetcher to preprocess the prefetched data before delivering the data into the cache.

50. The computing system of claim 48, wherein the prefetch directive further comprises attributes indicating at least one of the level of the cache that receives the prefetched data, the replacement and eviction policy of the cache, and the state of a new data block placed in the cache.

51. An article comprising a machine readable medium having stored thereon data which, when accessed by a processor in conjunction with simulation routines, provides functionality of a model including:
a target agent to execute a program;
an external source agent to supply at least a portion of data for the target agent to execute the program, and when having new data, to create and issue a prefetch directive; and
a hardware prefetcher associated with the target agent, when receiving and recognizing the prefetch directive, to issue a request to prefetch the new data from a memory to a target cache;

wherein the target agent has more efficient access to data in the target cache than access to data in the memory.

52. The article of claim 51, wherein the prefetch directive is sent to agents including at least the target agent along with interconnection transactions existed at least between the target agent and the external source agent.

53. The article of claim 51, wherein the prefetch directive is sent as a separate transaction to agents, including at least the target agent.

* * * * *